US012647236B2

(12) United States Patent
Zhang et al.

(10) Patent No.: US 12,647,236 B2
(45) Date of Patent: Jun. 2, 2026

(54) METHODS AND APPARATUS OF RATE MATCHING MECHANISM

(71) Applicant: Lenovo (Beijing) Limited, Beijing (CN)

(72) Inventors: Yi Zhang, Beijing (CN); Chenxi Zhu, Fairfax, VA (US); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 352 days.

(21) Appl. No.: 18/271,530

(22) PCT Filed: Jan. 12, 2021

(86) PCT No.: PCT/CN2021/071239
§ 371 (c)(1),
(2) Date: Jul. 10, 2023

(87) PCT Pub. No.: WO2022/150960
PCT Pub. Date: Jul. 21, 2022

(65) Prior Publication Data
US 2024/0313924 A1 Sep. 19, 2024

(51) Int. Cl.
*H04L 5/00* (2006.01)
*H04L 1/00* (2006.01)
(52) U.S. Cl.
CPC .......... *H04L 5/0053* (2013.01); *H04L 1/0013* (2013.01)
(58) Field of Classification Search
CPC .... H04L 5/0053; H04L 1/0013; H04L 5/0058
See application file for complete search history.

(56) References Cited

U.S. PATENT DOCUMENTS

| | | | | |
|---|---|---|---|---|
| 11,838,132 B2 * | 12/2023 | Yeo | ...................... | H04L 1/1812 |
| 2021/0084634 A1 * | 3/2021 | Li | ......................... | H04W 72/23 |
| 2022/0394743 A1 * | 12/2022 | Park | ..................... | H04L 5/0094 |

FOREIGN PATENT DOCUMENTS

| | | |
|---|---|---|
| CN | 110035510 A | 7/2019 |
| CN | 110958067 A | 4/2020 |

(Continued)

OTHER PUBLICATIONS

TSG-RAN WG1#88, R1-1702629 Title: E-mail discussion on 2-stage DCI for NR (Year: 2017).*

(Continued)

*Primary Examiner* — Faruk Hamza
*Assistant Examiner* — Abusayeed M Haque
(74) *Attorney, Agent, or Firm* — FIG. 1 Patents

(57) ABSTRACT

Methods and apparatus of rate matching mechanism for PDSCH scheduled by enhanced PDCCH with multiple transmissions are disclosed. The method includes: receiving, by a receiver, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and determining, by a processor, resources not available for Physical Downlink Shared Channel (PDSCH) based on a linkage between the CORESETs, the search space sets, or the candidates, for rate matching.

20 Claims, 3 Drawing Sheets 602
transmitting, by a transmitter, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities 604
performing, by a processor, rate matching with determination of resources not available for Physical Downlink Shared Channel (PDSCH) based on a linkage between the CORESETs, the search space sets, or the candidates, for rate matching

(56)          References Cited

FOREIGN PATENT DOCUMENTS

| CN | 111566976 | * | 8/2020 | ........... H04L 5/0053 |
|---|---|---|---|---|
| CN | 111566976 A | | 8/2020 | |
| WO | 2020022523 A1 | | 1/2020 | |
| WO | WO-2020167184 A1 | * | 8/2020 | ............ H04W 72/54 |

OTHER PUBLICATIONS

3GPP TSG RAN WG1#90, R1-1713419 Title:Nested search space design (Year: 2017).*

PCT/CN2021/071239 , "International Preliminary Report on Patentability", PCT Application No. PCT/CN2021/071239, Jul. 27, 2023, 5 pages.

PCT/CN2021/071239 , "International Search Report and Written Opinion", PCT Application No. PCT/CN2021/071239, Sep. 28, 2021, 6 pages.

* cited by examiner

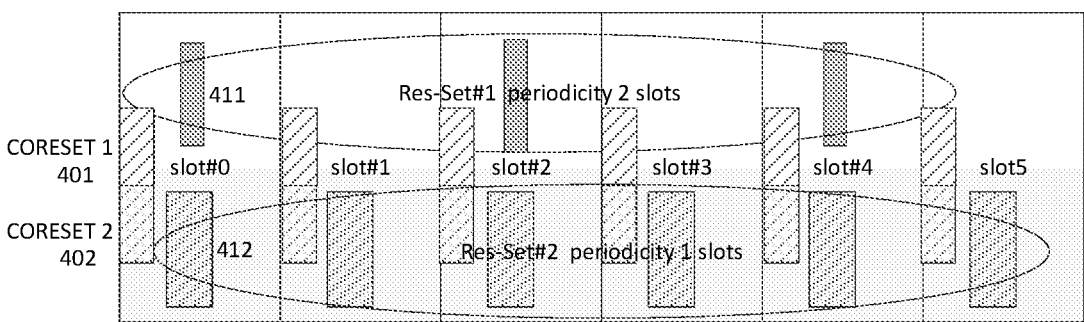

Figure 4

| 502 |
| --- |
| receiving, by a receiver, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities |

| 504 |
| --- |
| determining, by a processor, resources not available for Physical Downlink Shared Channel (PDSCH) based on a linkage between the CORESETs, the search space sets, or the candidates, for rate matching |

Figure 5

| 602 |
| --- |
| transmitting, by a transmitter, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities |

| 604 |
| --- |
| performing, by a processor, rate matching with determination of resources not available for Physical Downlink Shared Channel (PDSCH) based on a linkage between the CORESETs, the search space sets, or the candidates, for rate matching |

Figure 6

METHODS AND APPARATUS OF RATE MATCHING MECHANISM

FIELD

The subject matter disclosed herein relates generally to wireless communication and more particularly relates to, but not limited to, methods and apparatus of rate matching mechanism for Physical Downlink Shared Channel (PDSCH) scheduled by enhanced Physical Downlink Control Channel (ePDCCH) with multiple transmissions.

BACKGROUND

The following abbreviations and acronyms are herewith defined, at least some of which are referred to within the specification:

Third Generation Partnership Project (3GPP), Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Enhanced Physical Downlink Control Channel (ePDCCH), Bandwidth Part (BWP), Control Element (CE), Control Resource Set (CORESET), Downlink Control Information (DCI), Frequency Division Multiple Access (FDMA), Identification (ID), Media Access Control (MAC), Resource Block (RB), Resource Element (RE), Resource-Element Group (REG), Radio Resource Control (RRC), Single Frequency Network (SFN), Semi-Persistent Scheduling (SPS), Transmit Receive Point (TRP), Frequency Range 1 (FR1), Frequency Range 2 (FR2), Technical Specification (TS), Demodulation reference signal (DM-RS).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) allows exploitation of the resources from multiple TRPs to improve PDCCH transmission reliability and robustness. Multiple transmissions of the ePDCCH may be transmitted from a same TRP or some different TRPs.

SUMMARY

Methods and apparatus of rate matching mechanism for PDSCH scheduled by enhanced PDCCH with multiple transmissions are disclosed.

According to a first aspect, there is provided a method, including: receiving, by a receiver, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and determining, by a processor, resources not available for Physical Downlink Shared Channel (PDSCH) based on a linkage between the CORESETs, the search space sets, or the candidates, for rate matching.

According to a second aspect, there is provided a method, including: transmitting, by a transmitter, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and performing, by a processor, rate matching with determination of resources not available for Physical Downlink Shared Channel (PDSCH) based on a linkage between the CORESETs, the search space sets, or the candidates, for rate matching.

According to a third aspect, there is provided an apparatus, including: a receiver that receives configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and a processor that determines resources not available for Physical Downlink Shared Channel (PDSCH) based on a linkage between the CORESETs, the search space sets, or the candidates, for rate matching.

According to a fourth aspect, there is provided an apparatus, including: a transmitter that transmits configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and a processor that performs rate matching with determination of resources not available for Physical Downlink Shared Channel (PDSCH) based on a linkage between the CORESETs, the search space sets, or the candidates, for rate matching.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 4 is a schematic diagram illustrating an example of dynamic rate matching for multiple CORESETs to support enhanced PDCCH transmission in accordance with some implementations of the present disclosure;

FIG. 5 is a flow chart illustrating steps of rate matching mechanism for PDSCH scheduled by enhanced PDCCH by UE in accordance with some implementations of the present disclosure; and FIG. 6 is a flow chart illustrating steps of rate matching mechanism for PDSCH scheduled by enhanced PDCCH by gNB or NE in accordance with some implementations of the present disclosure.

DETAILED DESCRIPTION

Figure 1:
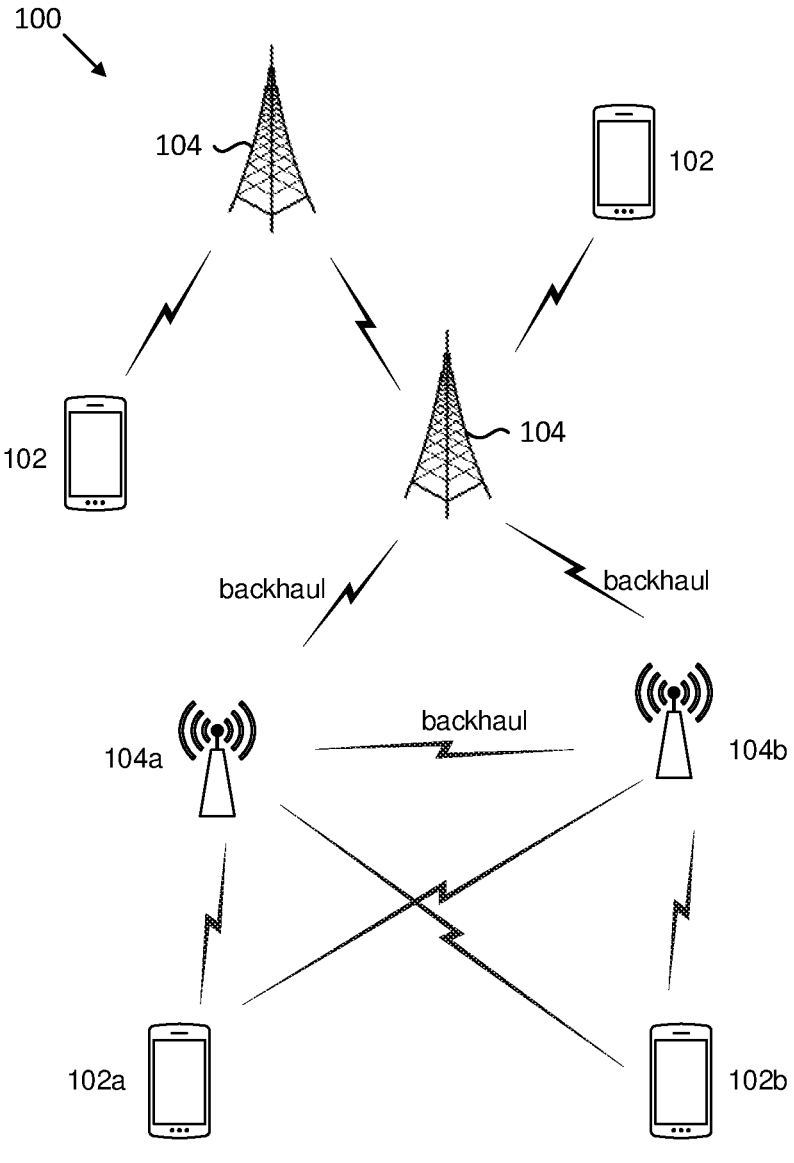
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
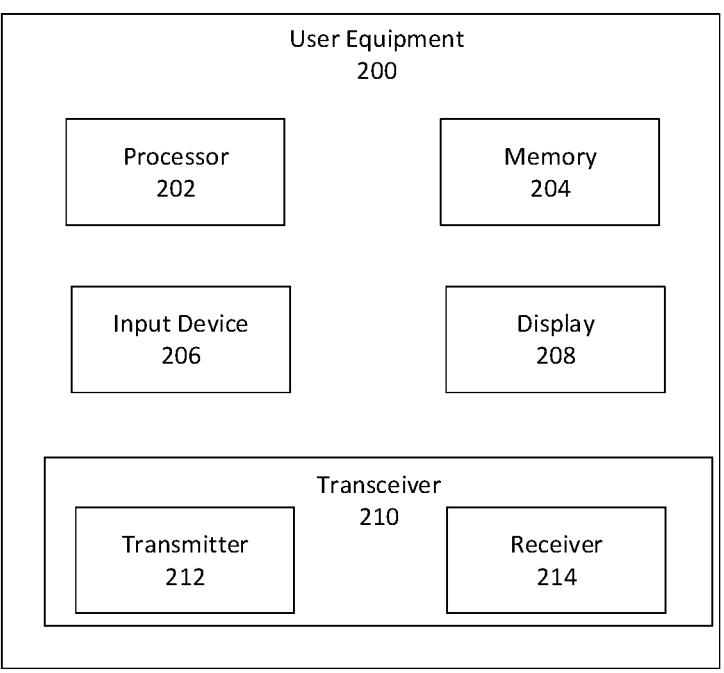
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
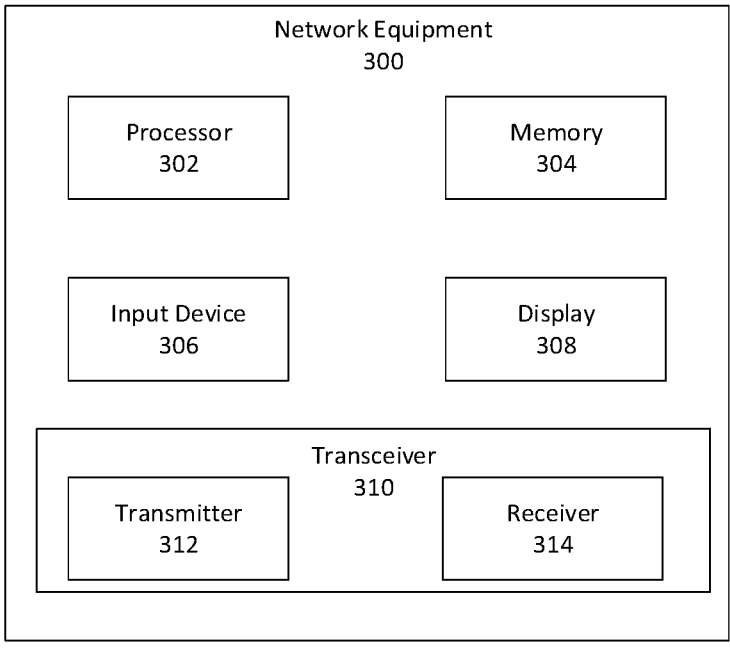
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

For normal PDCCH, a Downlink Control Information (DCI) is transmitted on only one candidate. However, for ePDCCH (enhanced PDCCH) transmission, one DCI may be transmitted with multiple candidates with repetitions from multiple TRPs to improve reliability, i.e., multiple candidates with multiple repeat transmissions may be used for enhanced PDCCH transmission.

For non-SFN (Single Frequency Network) based mTRP (multiple-TRP) PDCCH reliability enhancements, different encoding/rate matching options are possible. In one of the options, the encoding/rate matching is based on one repetition, and the same coded bits are repeated for the other repetition. Each repetition has the same number of Control Channel Elements (CCEs) and coded bits, and corresponds to the same DCI payload.

The PDCCH candidates may be linked with one another for transmissions of the PDCCH. In one of the cases, two or more enhanced PDCCH candidates for one DCI transmission are explicitly linked together and UE knows explicitly the linkage among these enhanced PDCCH candidates before decoding.

Based on rate matching mechanism in Release 15, configured or dynamically indicated resources are not available for PDSCH, where two rate matching resource groups including corresponding rate matching pattern lists are defined for indicating reserved resources (i.e., resources that are not available for PDSCH). Only one CORESET is configured in one rate matching pattern. In addition, the detected PDCCH and corresponding DM-RS are not available for PDSCH.

For enhanced PDCCH transmission, multiple linked CORESETs and linked search space sets are configured and candidates with explicit linkage are used by multiple transmissions and/or multiple beams. Therefore, this linkage between CORESETs, search space sets, or candidates may be exploited for enhanced rate matching mechanism.

In the disclosure, enhanced rate matching mechanism with simultaneous rate matching on resources for multiple CORESETs, multiple search space sets, or multiple linked candidates in the case of ePDCCH transmission is proposed.

Rate matching mechanism for PDSCH scheduled by normal PDCCH is specified in Technical Specification (TS) 38.214, where the configured or dynamically indicated resources are not available for PDSCH. The detailed information is as follows.

When receiving PDSCH scheduled by PDCCH with CRC scrambled by C-RNTI, MCS-C-RNTI, CS-RNTI, or PDSCHs with SPS, the REs corresponding to the configured or dynamically indicated resources in Clauses 5.1.4.1, 5.1.4.2 are not available for PDSCH. Furthermore, the UE assumes SS/PBCH block transmission according to ssb-PositionsInBurst if the PDSCH resource allocation overlaps with PRBs containing SS/PBCH block transmission resources, the UE shall assume that the PRBs containing SS/PBCH block transmission resources are not available for PDSCH in the OFDM symbols where SS/PBCH block is transmitted.

In detail, two rate matching pattern groups are used to define Resource Elements (REs) not available for PDSCH. For each rate matching pattern group, there is a list of rate matching patterns, which may be at cell level or Bandwidth Part (BWP) level. For each rate matching pattern, it consists of a reserved resource set and a CORESET. The reserved resource set is defined by Resource Block (RB) level bitmap, i.e. resourceBlocks, symbol level bitmap, i.e. symbolsInRe-sourceBlock, and i.e. a time-domain pattern bitmap, peri-odicityAndPattern. The CORESET is defined by CORESET ID, where the frequency domain resources are defined by the CORESET ID and the time domain resources are defined by monitoringSlotPeriodicityAndOffset, duration and monitor-ingSymbolsWithinSlot of all search space sets associated with this CORESET. The detailed information in TS 38.214 is shown as follows.

rateMatchPatternToAddModList given by PDSCH-Config, by ServingCellConfig or by ServingCellConfigCommon and configuring up to 4 RateMatchPattern(s) per BWP and up to 4 RateMatchPattern(s) per serving-cell. A RateMatchPattern may contain:
- within a BWP, when provided by PDSCH-Config or within a serving cell when provided by ServingCellConfig or ServingCellConfigCommon, a pair of reserved resources with numerology provided by higher layer parameter subcarrierSpacing given by RateMatchPattern when configured per serving cell or by numerology of associated BWP when configured per BWP .The pair of reserved resources are respectively indicated by an RB level bitmap (higher layer parameter resourceBlocks given by RateMatchPattern ) with 1RB granularity and a symbol level bitmap spanning one or two slots (higher layer parameters symbolsInResourceBlock given by RateMatchPattern ) for which the reserved RBs apply. A bit value equal to 1 in the RB and symbol level bitmaps indicates that the corresponding resource is not available for PDSCH. For each pair of RB and symbol level bitmaps, a UE may be configured with a time-domain pattern (higher layer parameter periodicityAndPattern given by RateMatchPattern ), where each bit of periodicityAndPattern corresponds to a unit equal to a duration of the symbol level bitmap, and a bit value equal to 1 indicates that the pair is present in the unit. The periodicityAndPattern can be {1, 2, 4, 5, 8, 10, 20 or 40} units long, but maximum of 40ms. The first symbol of periodicityAndPattern every 40ms/P periods is a first symbol in frame nf mod 4 = 0, where P is the duration of periodicityAndPattern in units of ms. When periodicityAndPattern is not configured for a pair, for a symbol level bitmap spanning two slots, the bits of the first and second slots correspond respectively to even and odd slots of a radio frame, and for a symbol level bitmap spanning one slot, the bits of the slot correspond to every slot of a radio frame. The pair can be included in one or two groups of resource sets (higher layer parameters rateMatchPatternGroup1and rateMatchPatternGroup2). The rateMatchPatternToAddModList given by ServingCellConfig or ServingCellConfigCommon configuration in numerology u applies only to PDSCH of the same numerology μ.
- within a BWP, a frequency domain resource of a CORESET configured by ControlResourceSet with controlResourceSetId or ControlResourceSetZero and time domain resource determined by the higher layer parameters monitoringSlotPeriodicityAndOffset, duration and monitoringSymbolsWithinSlot of all search-space-sets configured by SearchSpace and time domain resource of search-space-set zero configured by searchSpaceZero associated with the CORESET as well as CORESET duration configured by ControlResourceSet with controlResourceSetId or ControlResourceSetZero. This resource not available for PDSCH can be included in one or two groups of resource sets (higher layer parameters rateMatchPatternGroup1 and rateMatchPatternGroup2).

The related signaling information for RateMatchPattern is defined in TS 38.331. The detailed information is as follows.

| RateMatchPattern information element | |
| --- | --- |
| RateMatchPattern ::= | SEQUENCE { |
| rateMatchPatternId | RateMatchPatternId, |
| patternType | CHOICE { |
| bitmaps | SEQUENCE { |
| resourceBlocks | BIT STRING (SIZE (275)), |
| symbolsInResourceBlock | CHOICE { |
| oneSlot | BIT STRING (SIZE (14)), |
| twoSlots | BIT STRING (SIZE (28)) |
| }, | |
| periodicityAndPattern | CHOICE { |
| n2 | BIT STRING (SIZE (2)), |
| n4 | BIT STRING (SIZE (4)), |
| n5 | BIT STRING (SIZE (5)), |

-continued

| RateMatchPattern information element |
|---|

```
                    n8                    BIT STRING (SIZE (8)),
                    n10                   BIT STRING (SIZE (10)),
                    n20                   BIT STRING (SIZE (20)),
                    n40                   BIT STRING (SIZE (40))
                    }
OPTIONAL,      -- Need S
                    ...
        },
        controlResourceSet            ControlResourceSetId
    },
    subcarrierSpacing                 SubcarrierSpacing
OPTIONAL,      -- Cond CellLevel
        dummy                         ENUMERATED { dynamic, semiStatic },
        ...,
    [[
    controlResourceSet-r16            ControlResourceSetId-r16
OPTIONAL       -- Need R
    ]]
}
```

Dynamic signaling indication or semi-static indication may be used to indicate resources not available for PDSCH. The detailed information in TS 38.214 is shown as follows.

A configured group rateMatchPatternGroup1 or rateMatchPatternGroup2 contains a list of indices
    of RateMatchPattern(s) forming a union of resource-sets not available for a PDSCH dynamically
    if a corresponding bit of the Rate matching indicator field of the DCI format 1_1 scheduling the
    PDSCH is equal to 1. The REs corresponding to the union of resource-sets configured by
    RateMatchPattern(s) that are not included in either of the two groups are not available for a
    PDSCH scheduled by a DCI format 1_0, a PDSCH scheduled by a DCI format 1_1, and PDSCHs
    with SPS. When receiving aPDSCH scheduled by a DCI format 1_0 or PDSCHs with SPS
    activated by a DCI format 1_0, the REs corresponding to configured resources in
    rateMatchPatternGroup1 or rateMatchPatternGroup2 are not available for the scheduled
    PDSCH.
For a bitmap pair included in one or two groups of resource sets, the dynamic indication of
    availability for PDSCH applies to a set of slot(s) where the rateMatchPatternToAddModList is
    present among the slots of scheduled PDSCH.

When a PDSCH scheduled by a PDCCH would overlap with resources in the CORESET containing the PDCCH, the resources corresponding to a union of the detected PDCCH and associated PDCCH Demodulation Reference Signal (DM-RS) are not available for the PDSCH. The associated or corresponding DM-RS, may be DM-RS in REGs of PDCCH with precoder granularity as sameAsREG-bundle, or DM-RS in all REGs of CORESET with precoder granularity as allContiguousRBs. The detailed information in TS 38.214 is as follows.

According to a working assumption, encoding/rate matching is based on one repetition, and the same coded bits are repeated for the other repetition; each repetition has the same number of CCEs and coded bits and corresponds to the same DCI payload.

According to rate matching mechanism defined in Release 15, configured or dynamically indicated resources from two rate matching resource groups are not available for PDSCH. And when resources in the CORESET containing the sched- If a PDSCH scheduled by a PDCCH would overlap with resources in the CORESET containing the
    PDCCH, the resources corresponding to a union of the detected PDCCH that scheduled the
    PDSCH and associated PDCCH DM-RS are not available for the PDSCH. When
    precoderGranularity configured in a CORESET where the PDCCH was detected is equal to
    allContiguousRBs, the associated PDCCH DM-RS are DM-RS in all REGs of the CORESET.
    Otherwise, the associated DM-RS are the DM-RS in REGs of the PDCCH or the activated
    PDSCHs with SPS. When receiving PDSCHs with SPS activated by a DCI format 1_1, the REs
    corresponding to configured resources in rateMatchPatternGroup1 or rateMatchPatternGroup2
    are not available for the PDSCHs with SPS if a corresponding bit of the Rate matching indicator
    field of the DCI format 1_1 activating the PDSCHs with SPS is equal to 1.

Thus, for conventional rate matching, a single CORESET is included in one rate matching pattern (i.e., RateMatch-Pattern) for defining resources not available for PDSCH. And the resources for detected PDCCH and corresponding DM-RS are not available for PDSCH.

uling PDCCH overlap with PDSCH, the union of the detected PDCCH and the DM-RS of corresponding PDCCH is not available for PDSCH.

For ePDCCH transmission, multiple CORESETs and search space sets are configured. Two or more candidates are explicitly linked together for soft combing to improve transmission reliability. This disclosure provides enhanced rate matching mechanism where enhanced PDCCH with multiple repetitions are transmitted from multiple TRPs. The enhanced rate matching mechanism exploits the linkage between CORESETs, search space sets, or candidates to achieve good tradeoff between signaling overhead and resource usage efficiency. It includes enhancement on CORESETs and detected PDCCH candidates for determining resources not available for PDSCH.

Rate Matching Enhancement on Multiple CORESETs for ePDCCH Transmission

For ePDCCH transmission, multiple CORESETs and search space sets are configured. When multiple CORESETs are used for ePDCCH transmission, the resources corresponding to the multiple CORESETs and search space sets for ePDCCH transmission may be made rate matching for PDSCH, simultaneously. Three possible schemes are proposed as follows.

Scheme 1

For current Release 16 rate matching signaling, there is only one CORESET ID and the combined rate matching pattern consists of bitmaps for reserved resource blocks.

In this scheme, multiple CORESETs (e.g. controlResourceSet and controlResourceSetAdd) are included in one rate matching pattern on account that these CORESETs are used for one DCI transmission and may be made rate matching together.

Based on the introduced enhanced rate matching pattern and current rate matching mechanism, gNB may realize rate matching for multiple CORESETs by using available dynamic signaling that indicates rate matching group including the enhanced rate matching pattern.

This scheme is efficient for the signaling indicating rate matching resources in the rate matching pattern are not available for PDSCH. When multiple CORESETs are included in one rate matching pattern in the case of ePDCCH transmission, in some other examples, only the resources indicated by the linked search space sets for ePDCCH transmission are required to be rate matched since only these resources are used for ePDCCH transmission.

For example, CORESET 1 and CORESET 2 are configured for ePDCCH transmission. Search space set 1 and search space set 2 are associated with CORESET 1 in the configuration of the search space sets. Search space set 3, and search space set 4 are associated with CORESET 2. Only search space set 1 and search space set 3 are configured to monitor candidates with ePDCCH transmission. In a first embodiment, all search space sets 1, 2, 3 and 4, that are associated with CORESETs 1 and 2, are not available for PDSCH. In a second embodiment, only resources indicated by {CORESET 1, search space set 1} and {CORESET 2, search space set 3} are not available for PDSCH since they are used for ePDCCH transmission. The resources indicated by {CORESET 1, search space set 2} and {CORESET 2, search space set 4} may be available for PDSCH.

That is, multiple CORESETs may be included in one rate matching pattern for making simultaneous rate matching for multiple CORESETs for ePDCCH transmission. In some examples, all resources indicated by search space sets associated with these CORESETs are not available for PDSCH rate matching. In some examples, only the resources indicated by the linked search space sets for transmission of the PDCCH that are associated with these CORESETs are not available for PDSCH.

Scheme 2

In this scheme, the resources corresponding to multiple CORESETs for ePDCCH transmission are always made rate

```
                    RateMatchPattern information element

RateMatchPattern ::=                    SEQUENCE {
    rateMatchPatternId                      RateMatchPatternId,
    patternType                             CHOICE {
        bitmaps                                 SEQUENCE {
                    resourceBlocks                  BIT STRING (SIZE (275)),
                    symbolsInResourceBlock          CHOICE {
                        ...
                    },
                    periodicityAndPattern           CHOICE {
                        ...
                    }
        OPTIONAL,       -- Need S
                    ...
        },
        controlResourceSet                      ControlResourceSetId
        controlResourceSetAdd                   ControlResourceSetId
    },
    subcarrierSpacing                       SubcarrierSpacing
    OPTIONAL,       -- Cond CellLevel
    dummy                                   ENUMERATED { dynamic, semiStatic },
    ...,
}
``` with combination of one reserved resource set and multiple CORESETs since only one rate matching pattern is needed. It will be useful when there are multiple reserved resource blocks but still with restriction of 4 cell and BWP level rate matching pattern based on the current specification. In an example for signaling realization as shown below, additional CORESET ID, i.e. controlResourceSetAdd, is imported in one rate matching pattern, i.e. RateMatchPattern.

In some examples, the resources determined by all the search space sets associated with the CORESETs indicated matching together. It is thus not necessary to import any additional CORESET ID in the rate matching pattern.

When a first one of two linked CORESETs is included in the rate matching pattern, the resources corresponding to the second one of the linked CORESETs are implicitly made rate matching. That is, the resources corresponding to the second CORESET, though not indicated in the rate matching pattern, are not available for PDSCH as well.

For example, CORESET 1 and CORESET 2 are used for ePDCCH transmission. When a rate matching pattern group including a rate matching pattern containing CORESET 1 is indicated by DCI signaling for rate matching, resources corresponding to CORESET 2 are not available for PDSCH as well, by implicit principle.

Here, the implicitly determined resources for rate matching may also be restricted in a similar way as that in the example of Scheme 1. That is, only the resources indicated by linked search space sets for transmission of the PDCCH that are associated with the linked CORESETs are not available for PDSCH. This scheme is simple for standardization because no change is required for rate matching signaling. However, it may not be able to provide flexibility with rate matching around only one CORESET among multiple CORESETs for ePDCCH transmission, whereas this may be realized by flexible rate matching pattern configuration in the first scheme.

For PDSCH scheduled by DCI format 1-0 or PDSCHs with SPS activated by a DCI format 1_0, there is no DCI field for dynamical indicating rate matching pattern group. UE will make rate matching for a union set of resources configured by two rate matching resource groups. To make rate matching for both CORESETs for ePDCCH transmission, the UE is not expected that only one CORESET is configured in any one of two rate matching pattern groups with its associated CORESET is not configured in any one of two rate matching pattern groups. That is, the two CORESETs may be configured in a manner such that either both of them in the rate matching groups, or none of them in the rate matching groups. Alternatively, it may be realized by this proposed scheme with implicit linkage for simultaneous rate matching on both CORESETs for ePDCCH transmission.

That is, when one CORESET is configured in the rate matching pattern, the resources corresponding to its associated CORESET for ePDCCH transmission are implicitly not available for PDSCH. In some examples, resources corresponding to all search space sets that are associated with linked CORESETs are not available for PDSCH. In some other examples, only resources corresponding to linked search space sets for transmission of the PDCCH that are associated with linked CORESETs are not available for PDSCH.

Scheme 3

In this scheme, dynamic rate matching for linked CORESETs may be supported with restriction configuration for rate matching pattern group. This does not change the RRC signaling as Scheme 1 and has no requirement for implicit linkage between CORESETs for rate matching as Scheme 2.

In detail, rate matching patterns with different CORESETs for ePDCCH transmission are configured into different rate matching pattern groups. That is, each rate matching pattern group includes only rate matching patterns with a single one of the CORESETs that are linked. When both CORESETs are used for PDCCH transmission, it may be realized by signaling through the rate matching indicator field of DCI indicating both rate matching pattern groups and then the corresponding resources are not available for PDSCH. When only one CORESET is used for PDCCH transmission, the resources corresponding to the indicated rate matching group are not available for PDSCH.

With restriction of rate matching pattern including CORESETs for ePDCCH into different rate matching pattern groups, it may make flexible rate matching for CORESETs based on actual ePDCCH transmission and improve resource usage efficiency.

FIG. 4 is a schematic diagram illustrating an example of dynamic rate matching for multiple CORESETs to support enhanced PDCCH transmission in accordance with some implementations of the present disclosure.

In this example, two CORESETs (401, 402) and two Res-Sets (resource sets 411, 412) are provided for PDSCH rate matching, with resource set 1 (411) as reserved resources for high priority service 1 and resource set 2 (412) as reserved resources for high priority service 2. A resource set is a set of RBs in the frequency domain and a set of symbols in the time domain, and is defined with bitmaps in RRC. One resource set, e.g. resource set 1 or 2, is indicated by 3 bitmaps as defined in specification, which are RB level bitmap, i.e. resourceBlocks, symbol level bitmap, i.e. symbolsInResourceBlock, and a time-domain pattern bitmap, i.e. periodicityAndPattern.

Four rate matching patterns may be configured as:
Pattern 1 with {Res-Set 1, CORESET 1},
Pattern 2 with {Res-Set 1, CORESET 2},
Pattern 3 with {Res-Set 2, CORESET 1}, and
Pattern 4 with {Res-Set 2, CORESET 2}.
Two resource pattern groups may be configured as:
Pattern group 1 {Pattern 1, Pattern 3};
Pattern group 2 {Pattern 2, Pattern 4}.

Rate matching around CORESET 1, or CORESET 2, or CORESETs {1,2} may be realized by dynamic signaling of '10' or '01' or '11' respectively. In the example, with restriction configuration, rate matching patterns with different CORESET IDs, e.g. Pattern 1 and Pattern 2, are configured into different rate matching pattern groups.

Thus, in this scheme, each rate matching pattern group include only rate matching patterns with a single one of the CORESETs that are linked. Rate matching patterns with different CORESETs for ePDCCH transmission are restricted to be configured into different rate matching pattern groups to support dynamic switching for PDCCH transmission with single CORESET and multiple CORESETs.

Rate Matching Enhancement on Multiple Candidates for ePDCCH Transmission

For ePDCCH transmission, multiple candidates with explicit linkage may be used. When PDSCH scheduled by a PDCCH overlaps with resources in the CORESET containing the PDCCH, the resources corresponding to a union of the detected PDCCH that scheduled the PDSCH and associated PDCCH DM-RS are not available for the PDSCH. For ePDCCH, there may be one or multiple detected PDCCHs on account of multiple candidates for ePDCCH transmission. To align understanding on resources for PDSCH transmission, two possible schemes are proposed to determine or to indicate candidate(s) and corresponding DM-RS for PDSCH rate matching.

Scheme 4

In this scheme, rate matching is always made on multiple candidates and corresponding DM-RS for ePDCCH transmission no matter whether they are correctly detected.

In detail, when UE receives explicit high layer signaling for indicating multiple linked candidates, the UE will assume that resources for multiple candidates and corresponding DM-RS are not available for PDSCH.

When the linkage between candidates is implicitly determined, the RRC signaling or MAC CE signaling may be used to turn on ePDCCH transmission with multiple linked candidates. When the UE receives RRC signaling or MAC CE signaling to turn on ePDCCH transmission with multiple linked candidates, the UE will assume resources for multiple linked candidates and corresponding DM-RS are not available for PDSCH.

The RRC signaling or MAC CE signaling, may be a newly introduced signaling with new field of one bit for turning on, or turning off, ePDCCH transmission with multiple candidates. With this proposed scheme, same understanding on resources for rate matching may be achieved between the UE and gNB. In the case that one of the candidates is not actually used for ePDCCH transmission, there may be a slight waste of resource.

Thus, in this scheme, when the UE receives configuration signaling for linked candidates or signaling for turning on ePDCCH transmission with multiple linked candidates, the UE always assumes resources for multiple candidates and corresponding DM-RS are not available for PDSCH. The corresponding DM-RS may comprise DM-RS in REGs of the PDCCH with precoder granularity as sameAsREG-bundle, or DM-RS in all REGs of the CORESETs with precoder granularity as allContiguousRBs.

Scheme 5

In this scheme, dynamic rate matching is used based on actually used candidate(s). For candidates that are not detected, the reason of not being correctly detected may be because of poor channel quality, or because of not being transmitted due to flexible resource allocation by gNB's realization. To make alignment between the gNB and the UE regarding which candidates are used for PDCCH transmission, the PDCCH may include a DCI which includes a signaling for indicating selection of PDCCH candidates and corresponding DM-RS for rate matching. In some examples, a two-bit or one-bit dynamic signaling may be introduced to indicate which candidates are actually used for PDCCH transmission. For two-bit signaling, state '01', '10', or '11' may be used to indicate that the first candidate, the second candidate, or both candidates are used for ePDCCH transmission and are thus not used for PDSCH, respectively.

For one-bit signaling, state '0', or '1' may be used to indicate that one or two candidates are used for ePDCCH transmission and are thus not used for PDSCH, respectively. For state '0', the actual candidate may be determined from detected PDCCH.

For the dynamic signaling, it may be a newly introduced field, or a reused available dynamic signaling for rate matching when an existing field is not used. If dynamic signaling bits for rate matching are reused or re-explained, one bit may be used in the case that only one rate matching pattern group is configured in PDSCH-Config and two bits may be used in the case that no rate matching pattern group is configured in PDSCH-Config. Based on dynamic signaling indication, resources for indicated candidate(s) and corresponding DM-RS are not available for PDSCH and high resource usage efficiency may be achieved by flexible signaling indication.

Thus, in this scheme, dynamic signaling is introduced to indicate which PDCCH candidate(s) and corresponding DM-RS are not available for PDSCH. The corresponding DM-RS may comprise DM-RS in REGs of the PDCCH with precoder granularity as sameAsREG-bundle, or DM-RS in all REGs of the CORESETs with precoder granularity as allContiguousRBs.

FIG. 5 is a flow chart illustrating steps of rate matching mechanism for PDSCH scheduled by enhanced PDCCH by UE 200 in accordance with some implementations of the present disclosure.

At step 502, the receiver 214 of UE 200 receives configurations for a plurality of Control Resource Sets (CORE-SETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities.

At step 504, the processor 202 of UE 200 determines resources not available for Physical Downlink Shared Channel (PDSCH) based on a linkage between the CORESETs, the search space sets, or the candidates, for rate matching.

FIG. 6 is a flow chart illustrating steps of rate matching mechanism for PDSCH scheduled by enhanced PDCCH by gNB or NE 300 in accordance with some implementations of the present disclosure.

At step 602, the transmitter 312 of NE 300 transmits configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities.

At step 604, the processor 302 performs rate matching with determination of resources not available for Physical Downlink Shared Channel (PDSCH) based on a linkage between the CORESETs, the search space sets, or the candidates, for rate matching.

In one aspect, some items as examples of the disclosure concerning a method of a UE or remote device may be summarized as follows:

1. A method, comprising:
   receiving, by a receiver, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and
   determining, by a processor, resources not available for Physical Downlink Shared Channel (PDSCH) based on a linkage between the CORESETs, the search space sets, or the candidates, for rate matching.

2. The method of item 1, wherein at least one of the rate matching patterns comprises identifications of a plurality of CORESETs for rate matching.

3. The method of item 2, wherein the determined resources not available for PDSCH comprise resources indicated by search space sets associated with the plurality of CORESETs for rate matching.

4. The method of item 2, wherein the determined resources not available for PDSCH comprise resources indicated by linked search space sets for transmission of the PDCCH that are associated with the plurality of CORESETs for rate matching.

5. The method of item 1, wherein the rate matching pattern comprises a first CORESET, and the determined resources not available for PDSCH comprise resources corresponding to all search space sets that are associated with a second CORESET which is linked with the first CORESET.

6. The method of item 1, wherein the rate matching pattern comprises a first CORESET, and the determined resources not available for PDSCH comprise resources corresponding to search space sets for transmission of the PDCCH that are associated with a second CORESET which is linked with the first CORE-SET.

7. The method of item 1, wherein, upon determining that the PDSCH is scheduled by DCI format 1-0 or SPS activated by DCI format 1-0, the determined resources not available for PDSCH comprise resources corresponding to all search space sets that are associated with linked CORESETs.

8. The method of item 1, wherein, upon determining that the PDSCH is scheduled by DCI format 1-0 or SPS activated by DCI format 1-0, the determined resources not available for PDSCH comprise resources corresponding to linked search space sets for transmission of the PDCCH that are associated with linked CORE-SETs.

9. The method of item 1, wherein each rate matching pattern group comprises rate matching patterns with a single one of the CORESETs that are linked.

10. The method of item 1, wherein the receiver further receives configuration signaling for linked candidates, and the determined resources not available for PDSCH comprise resources for the linked candidates and corresponding DM-RS.

11. The method of item 1, wherein the receiver further receives a signaling for turning on PDCCH transmission with linked candidates, and the determined resources not available for PDSCH comprise resources for the linked candidates and corresponding DM-RS.

12. The method of item 1, wherein the PDCCH comprises a DCI which includes a signaling for indicating selection of PDCCH candidates and corresponding DM-RS for rate matching.

13. The method of item 12, wherein the signaling comprises two bits, with state '01', '10', or '11' indicating that a first candidate, a second candidate, or both candidates are used for PDCCH transmission, respectively.

14. The method of item 12, wherein the signaling comprises one bit, with state '0' or '1' indicating one candidate or two candidates are used for PDCCH transmission, respectively.

15. The method of item 14, wherein, upon determining that the signaling state is '0', the processor further determines actual used candidate based on detected PDCCH.

16. The method of any one of items 10 to 15, wherein the corresponding DM-RS comprises DM-RS in REGs of the PDCCH with precoder granularity as sameAsREG-bundle, or DM-RS in all REGs of the CORESETs with precoder granularity as allContiguousRBs.

In another aspect, some items as examples of the disclosure concerning a method of a NE or gNB may be summarized as follows:

17. A method, comprising:

transmitting, by a transmitter, configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and performing, by a processor, rate matching with determination of resources not available for Physical Downlink Shared Channel (PDSCH) based on a linkage between the CORESETs, the search space sets, or the candidates, for rate matching.

18. The method of item 17, wherein at least one of the rate matching patterns comprises identifications of a plurality of CORESETs for rate matching.

19. The method of item 18, wherein the determined resources not available for PDSCH comprise resources indicated by search space sets associated with the plurality of CORESETs for rate matching.

20. The method of item 18, wherein the determined resources not available for PDSCH comprise resources indicated by linked search space sets for transmission of the PDCCH that are associated with the plurality of CORESETs for rate matching 21. The method of item 17, wherein the rate matching pattern comprises a first CORESET, and the determined resources not available for PDSCH comprise resources corresponding to all search space sets that are associated with a second CORESET which is linked with the first CORESET.

22. The method of item 17, wherein the rate matching pattern comprises a first CORESET, and the determined resources not available for PDSCH comprise resources corresponding to search space sets for transmission of the PDCCH that are associated with a second CORESET which is linked with the first CORE-SET.

23. The method of item 17, wherein, upon determining that the PDSCH is scheduled by DCI format 1-0 or SPS activated by DCI format 1-0, the determined resources not available for PDSCH comprise resources corresponding to all search space sets that are associated with linked CORESETs.

24. The method of item 17, wherein, upon determining that the PDSCH is scheduled by DCI format 1-0 or SPS activated by DCI format 1-0, the determined resources not available for PDSCH comprise resources corresponding to linked search space sets for transmission of the PDCCH that are associated with linked CORE-SETs.

25. The method of item 17, wherein each rate matching pattern group comprises rate matching patterns with a single one of the CORESETs that are linked.

26. The method of item 17, wherein the transmitter further transmits configuration signaling for linked candidates, and the determined resources not available for PDSCH comprise resources for the linked candidates and corresponding DM-RS.

27. The method of item 17, wherein the transmitter further transmits a signaling for turning on PDCCH transmission with linked candidates, and the determined resources not available for PDSCH comprise resources for the linked candidates and corresponding DM-RS.

28. The method of item 17, wherein the PDCCH comprises a DCI which includes a signaling for indicating selection of PDCCH candidates and corresponding DM-RS for rate matching.

29. The method of item 28, wherein the signaling comprises two bits, with state '01', '10', or '11' indicating that a first candidate, a second candidate, or both candidates are used for PDCCH transmission, respectively.

30. The method of item 28, wherein the signaling comprises one bit, with state '0' or '1' indicating one candidate or two candidates are used for PDCCH transmission, respectively.

31. The method of item 30, wherein, upon determining that the signaling state is '0', the processor further determines actual used candidate based on detected PDCCH.

32. The method of any one of items 26 to 31, wherein the corresponding DM-RS comprises DM-RS in REGs of the PDCCH with precoder granularity as sameAsREG-bundle, or DM-RS in all REGs of the CORESETs with precoder granularity as allContiguousRBs.

In a further aspect, some items as examples of the disclosure concerning a UE or remote device may be summarized as follows:

33. An apparatus, comprising:

a receiver that receives configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and a processor that determines resources not available for Physical Downlink Shared Channel (PDSCH) based on a linkage between the CORESETs, the search space sets, or the candidates, for rate matching.

34. The apparatus of item 33, wherein at least one of the rate matching patterns comprises identifications of a plurality of CORESETs for rate matching.

35. The apparatus of item 34, wherein the determined resources not available for PDSCH comprise resources indicated by search space sets associated with the plurality of CORESETs for rate matching.

36. The apparatus of item 34, wherein the determined resources not available for PDSCH comprise resources indicated by linked search space sets for transmission of the PDCCH that are associated with the plurality of CORESETs for rate matching.

37. The apparatus of item 33, wherein the rate matching pattern comprises a first CORESET, and the determined resources not available for PDSCH comprise resources corresponding to all search space sets that are associated with a second CORESET which is linked with the first CORESET.

38. The apparatus of item 33, wherein the rate matching pattern comprises a first CORESET, and the determined resources not available for PDSCH comprise resources corresponding to search space sets for transmission of the PDCCH that are associated with a second CORESET which is linked with the first CORESET.

39. The apparatus of item 33, wherein, upon determining that the PDSCH is scheduled by DCI format 1-0 or SPS activated by DCI format 1-0, the determined resources not available for PDSCH comprise resources corresponding to all search space sets that are associated with linked CORESETs.

40. The apparatus of item 33, wherein, upon determining that the PDSCH is scheduled by DCI format 1-0 or SPS activated by DCI format 1-0, the determined resources not available for PDSCH comprise resources corresponding to linked search space sets for transmission of the PDCCH that are associated with linked CORE-SETs.

41. The apparatus of item 33, wherein each rate matching pattern group comprises rate matching patterns with a single one of the CORESETs that are linked.

42. The apparatus of item 33, wherein the receiver further receives configuration signaling for linked candidates, and the determined resources not available for PDSCH comprise resources for the linked candidates and corresponding DM-RS.

43. The apparatus of item 33, wherein the receiver further receives a signaling for turning on PDCCH transmission with linked candidates, and the determined resources not available for PDSCH comprise resources for the linked candidates and corresponding DM-RS.

44. The apparatus of item 33, wherein the PDCCH comprises a DCI which includes a signaling for indicating selection of PDCCH candidates and corresponding DM-RS for rate matching.

45. The apparatus of item 44, wherein the signaling comprises two bits, with state '01', '10', or '11' indicating that a first candidate, a second candidate, or both candidates are used for PDCCH transmission, respectively.

46. The apparatus of item 44, wherein the signaling comprises one bit, with state '0' or '1' indicating one candidate or two candidates are used for PDCCH transmission, respectively.

47. The apparatus of item 46, wherein, upon determining that the signaling state is '0', the processor further determines actual used candidate based on detected PDCCH.

48. The apparatus of any one of items 42 to 47, wherein the corresponding DM-RS comprises DM-RS in REGs of the PDCCH with precoder granularity as sameAs-REG-bundle, or DM-RS in all REGs of the CORESETs with precoder granularity as allContiguousRBs.

In a yet further aspect, some items as examples of the disclosure concerning a NE or gNB may be summarized as follows:

49. An apparatus, comprising:

a transmitter that transmits configurations for a plurality of Control Resource Sets (CORESETs), configurations for a plurality of search space sets, configurations for a plurality of rate matching patterns in a plurality of rate matching pattern groups, and a Physical Downlink Control Channel (PDCCH) transmitted with a plurality of repetitions; wherein the plurality of repetitions of the PDCCH are transmitted on a plurality of candidates from a plurality of transmitting-receiving identities; and a processor that performs rate matching with determination of resources not available for Physical Downlink Shared Channel (PDSCH) based on a linkage between the CORESETs, the search space sets, or the candidates, for rate matching.

50. The apparatus of item 49, wherein at least one of the rate matching patterns comprises identifications of a plurality of CORESETs for rate matching.

51. The apparatus of item 50, wherein the determined resources not available for PDSCH comprise resources indicated by search space sets associated with the plurality of CORESETs for rate matching.

52. The apparatus of item 50, wherein the determined resources not available for PDSCH comprise resources indicated by linked search space sets for transmission of the PDCCH that are associated with the plurality of CORESETs for rate matching 53. The apparatus of item 49, wherein the rate matching pattern comprises a first CORESET, and the determined resources not available for PDSCH comprise resources corresponding to all search space sets that are associated with a second CORESET which is linked with the first CORESET.

54. The apparatus of item 49, wherein the rate matching pattern comprises a first CORESET, and the determined resources not available for PDSCH comprise resources corresponding to search space sets for transmission of the PDCCH that are associated with a second CORESET which is linked with the first CORESET.

55. The apparatus of item 49, wherein, upon determining that the PDSCH is scheduled by DCI format 1-0 or SPS activated by DCI format 1-0, the determined resources not available for PDSCH comprise resources corresponding to all search space sets that are associated with linked CORESETs.

56. The apparatus of item 49, wherein, upon determining that the PDSCH is scheduled by DCI format 1-0 or SPS activated by DCI format 1-0, the determined resources not available for PDSCH comprise resources corresponding to linked search space sets for transmission of the PDCCH that are associated with linked CORESETs.

57. The apparatus of item 49, wherein each rate matching pattern group comprises rate matching patterns with a single one of the CORESETs that are linked.

58. The apparatus of item 49, wherein the transmitter further transmits configuration signaling for linked candidates, and the determined resources not available for PDSCH comprise resources for the linked candidates and corresponding DM-RS.

59. The apparatus of item 49, wherein the transmitter further transmits a signaling for turning on PDCCH transmission with linked candidates, and the determined resources not available for PDSCH comprise resources for the linked candidates and corresponding DM-RS.

60. The apparatus of item 49, wherein the PDCCH comprises a DCI which includes a signaling for indicating selection of PDCCH candidates and corresponding DM-RS for rate matching.

61. The apparatus of item 60, wherein the signaling comprises two bits, with state '01', '10', or '11' indicating that a first candidate, a second candidate, or both candidates are used for PDCCH transmission, respectively.

62. The apparatus of item 60, wherein the signaling comprises one bit, with state '0' or '1' indicating one candidate or two candidates are used for PDCCH transmission, respectively.

63. The apparatus of item 62, wherein, upon determining that the signaling state is '0', the processor further determines actual used candidate based on detected PDCCH.

64. The apparatus of any one of items 58 to 63, wherein the corresponding DM-RS comprises DM-RS in REGs of the PDCCH with precoder granularity as sameAs-REG-bundle, or DM-RS in all REGs of the CORESETs with precoder granularity as allContiguousRBs.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method performed by a user equipment (UE), the method comprising:
   receiving first configurations for control resource sets (CORESETs), second configurations for search space sets, third configurations for rate matching patterns in rate matching pattern groups, and a physical downlink control channel (PDCCH) transmitted with a plurality of repetitions, the plurality of repetitions of the PDCCH being transmitted on candidates from a plurality of transmitting-receiving entities, wherein a rate matching pattern of the rate matching patterns includes a first CORESET of the CORESETs; and
   determining resources not available for a physical downlink shared channel (PDSCH) based on a linkage between the CORESETs, the search space sets, or the candidates, for rate matching, wherein the determined resources not available for the PDSCH include resources corresponding to all of the search space sets that are associated with a second CORESET linked with the first CORESET.

2. The method of claim 1, wherein at least one of the rate matching patterns includes identifications of a plurality of the CORESETs for the rate matching.

3. The method of claim 2, wherein the determined resources not available for the PDSCH further include a set of resources indicated by at least one of the search space sets associated with the plurality of the CORESETs for the rate matching, or indicated by linked search space sets for transmission of the PDCCH that are associated with the plurality of the CORESETs for the rate matching.

4. The method of claim 1, wherein each of the rate matching pattern groups includes the rate matching patterns with a single one of the CORESETs that are linked.

5. The method of claim 1, further comprising receiving configuration signaling for linked candidates, wherein the determined resources not available for the PDSCH further include a set of resources for the linked candidates and a corresponding demodulation reference signal (DM-RS).

6. The method of claim 1, wherein the PDCCH includes a downlink control information (DCI) which includes a signaling for indicating selection of the candidates and a corresponding demodulation reference signal (DM-RS) for the rate matching.

7. The method of claim 5, wherein the corresponding DM-RS includes DM-RS in resource element groups (REGs) of the PDCCH with precoder granularity of sameAsREG-bundle, or DM-RS in all REGs of the CORESETs with precoder granularity of allContiguousRBs.

8. A user equipment (UE) for wireless communication, comprising:
   at least one memory; and
   at least one processor coupled with the at least one memory and configured to cause the UE to:
      receive first configurations for control resource sets (CORESETs), second configurations for search space sets, third configurations for rate matching patterns in rate matching pattern groups, and a physical downlink control channel (PDCCH) transmitted with a plurality of repetitions, the plurality of repetitions of the PDCCH being transmitted on candidates from a plurality of transmitting-receiving entities;

receive configuration signaling for linked candidates; and determine resources not available for a physical downlink shared channel (PDSCH) based on a linkage between the CORESETs, the search space sets, or the candidates, for rate matching, wherein the determined resources not available for the PDSCH include resources for the linked candidates and a corresponding demodulation reference signal (DM-RS).

9. The UE of claim 8, wherein at least one of the rate matching patterns includes identifications of a plurality of the CORESETs for the rate matching.

10. The UE of claim 9, wherein the determined resources not available for the PDSCH further include a set of resources indicated by the search space sets associated with the plurality of the CORESETs for the rate matching.

11. The UE of claim 9, wherein the determined resources not available for the PDSCH further include a set of resources indicated by linked search space sets for transmission of the PDCCH that are associated with the plurality of CORESETs for the rate matching.

12. The UE of claim 8, wherein a rate matching pattern includes a first CORESET, and wherein the determined resources not available for the PDSCH further include a set of resources corresponding to all of the search space sets that are associated with a second CORESET which is linked with the first CORESET.

13. The UE of claim 8, wherein a rate matching pattern includes a first CORESET, and wherein the determined resources not available for the PDSCH further include a set of resources corresponding to the search space sets for transmission of the PDCCH that are associated with a second CORESET which is linked with the first CORESET.

14. The UE of claim 8, wherein each of the rate matching pattern groups includes the rate matching patterns with a single one of the CORESETs that are linked.

15. The UE of claim 8, wherein the corresponding DM-RS includes DM-RS in resource element groups (REGs) of the PDCCH with precoder granularity of sameAsREG-bundle, or DM-RS in all REGs of the CORESETs with precoder granularity of allContiguousRBs.

16. The UE of claim 8, wherein the PDCCH includes a downlink control information (DCI) which includes a signaling for indicating selection of the candidates.

17. A network equipment (NE) for wireless communication, comprising:

at least one memory; and at least one processor coupled with the at least one memory and configured to cause the NE to:

transmit first configurations for control resource sets (CORESETs), second configurations for search space sets, third configurations for rate matching patterns in rate matching pattern groups, and a physical downlink control channel (PDCCH) transmitted with a plurality of repetitions, the plurality of repetitions of the PDCCH being transmitted on candidates from a plurality of transmitting-receiving entities;

receive configuration signaling for linked candidates; and perform rate matching based on a determination of resources not available for a physical downlink shared channel (PDSCH) based on a linkage between the CORESETs, the search space sets, or the candidates, for the rate matching, wherein the determined resources not available for the PDSCH include resources for the linked candidates and a corresponding demodulation reference signal (DM-RS).

18. The NE of claim 17, wherein at least one of the rate matching patterns includes identifications of a plurality of the CORESETs for the rate matching.

19. The NE of claim 17, wherein the determined resources not available for the PDSCH further include a set of resources indicated by the search space sets associated with the plurality of the CORESETs for the rate matching.

20. A method performed by a network equipment (NE), the method comprising:

transmitting first configurations for control resource sets (CORESETs), second configurations for search space sets, third configurations for rate matching patterns in rate matching pattern groups, and a physical downlink control channel (PDCCH) transmitted with a plurality of repetitions, the plurality of repetitions of the PDCCH being transmitted on candidates from a plurality of transmitting-receiving entities, wherein a rate matching pattern of the rate matching patterns includes a first CORESET of the CORESETs; and perform rate matching based on a determination of resources not available for a physical downlink shared channel (PDSCH) based on a linkage between the CORESETs, the search space sets, or the candidates, for the rate matching, wherein the determined resources not available for the PDSCH include resources.

* * * * *